United States Patent
Osako et al.

(10) Patent No.: US 11,080,499 B2
(45) Date of Patent: Aug. 3, 2021

(54) RECORDING TAPE CARTRIDGE AND BARCODE LABEL REISSUING METHOD

(71) Applicant: FUJIFILM CORPORATION, Tokyo (JP)

(72) Inventors: Ryosuke Osako, Kanagawa (JP); Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/842,774

(22) Filed: Apr. 8, 2020

(65) Prior Publication Data
US 2020/0327291 A1 Oct. 15, 2020

(30) Foreign Application Priority Data
Apr. 15, 2019 (JP) .............................. JP2019-076974

(51) Int. Cl.
| | |
|---|---|
| G06K 7/14 | (2006.01) |
| G11B 23/04 | (2006.01) |
| G06K 19/06 | (2006.01) |
| G06K 19/07 | (2006.01) |
| G06K 1/12 | (2006.01) |
| B32B 29/00 | (2006.01) |
| G06K 7/10 | (2006.01) |

(52) U.S. Cl.
CPC .......... *G06K 7/1417* (2013.01); *B32B 29/002* (2013.01); *G06K 1/121* (2013.01); *G06K 7/10366* (2013.01); *G06K 19/06037* (2013.01); *G06K 19/0723* (2013.01); *G11B 23/044* (2013.01); *B32B 2519/02* (2013.01)

(58) Field of Classification Search
CPC ............. G06K 7/1417; G06K 7/10366; G06K 19/06037; G06K 19/0723; G11B 23/044
See application file for complete search history.

(56) References Cited

U.S. PATENT DOCUMENTS

| | | | | |
|---|---|---|---|---|
| 2004/0004789 A1* | 1/2004 | Watanabe | ........ | G11B 23/08714 360/132 |
| 2013/0175380 A1* | 7/2013 | Sato | ........ | G11B 15/32 242/340 |
| 2016/0140570 A1* | 5/2016 | Rivlin | ........ | G06Q 30/018 705/317 |

FOREIGN PATENT DOCUMENTS

| | | |
|---|---|---|
| JP | 2004-198616 A | 7/2004 |
| JP | 2010-49727 A | 3/2010 |

* cited by examiner

*Primary Examiner* — Laura A Gudorf
(74) *Attorney, Agent, or Firm* — Solaris Intellectual Property Group, PLLC (57) ABSTRACT

A recording tape cartridge includes a case that accommodates a reel around which a recording tape is wound and a label that is attached to a label surface formed at a wall surface of the case. The wall surface is located at a side opposite to a direction in which the case is loaded into a drive device. The label includes a first label layer that is attached to the label surface and on which individual identification information is displayed in a two-dimensional code, and a second label layer attached to the first label layer with a peelable bonding force, the second label layer being capable of covering and concealing the two-dimensional code, and the individual identification information being displayed in a barcode on the second label layer. The two-dimensional code is displayed at a central part in a longitudinal direction of the label.

8 Claims, 6 Drawing Sheets

RECORDING TAPE CARTRIDGE AND BARCODE LABEL REISSUING METHOD

CROSS-REFERENCE TO RELATED APPLICATION

This application claims priority under 35 USC 119 from Japanese Patent Application No. 2019-076974 filed Apr. 15, 2019, the disclosure of which is incorporated by reference herein in its entirety.

BACKGROUND OF THE INVENTION

1. Field of the Invention

The present disclosure relates to a recording tape cartridge and a method for reissuing a barcode label.

2. Description of the Related Art

There is a case where a plurality of recording tape cartridges, which are used as external recording media of a computer or the like, are stored and kept in a storage referred to as a library. In a case in which a desired recording tape cartridge is loaded into a drive device, a recording tape cartridge has a rear part gripped by a robot hand provided at the library and thereby, is taken out from the library and is loaded into the drive device.

An individual recording tape cartridge stored in the library is identified by a barcode of a barcode label attached to a label surface formed at a rear wall of a case of the tape cartridge. That is, in the library, in a case in which the robot hand grips the rear part of the recording tape cartridge, the barcode of the barcode label attached to the label surface is read by a barcode reader provided at the robot hand.

As the barcode label, a barcode label capable of written a memo has been known traditionally (for example, refer to JP2010-049727A). Additionally, a label in which a two-dimensional code including service information (hereinafter, sometimes referred to as a "QR code" (registered trademark)) is displayed at both ends in a longitudinal direction on a front surface of a first label base material and a barcode including product information is displayed on a front surface of a second label base material has also been known traditionally (for example, refer to JP2004-198616A). In this label, a back surface of the second label base material is attached to the front surface of the first label base material, and a back surface of the first label base material is attached to the product.

SUMMARY OF THE INVENTION

In order to read the QR code, it is necessary to peel off the second label base material from the first label base material. However, a marginal part provided around the QR code is bonded to the second label base material with a certain degree of bonding force such that the second label base material is not inadvertently peeled off from the first label base material. For this reason, in a case in which the QR code is displayed at both ends in the longitudinal direction of the first label base material, there is a case that bonding is made up to a region immediately close to the QR code. In a case in which the second label base material is peeled from the first label base material, there is a risk that a part of the QR code is peeled off together with the second label base material and is lost.

Thus, an object of the present disclosure is to provide a recording tape cartridge provided with a label having a two-layer structure capable of preventing a loss or the like from occurring at a two-dimensional code even in a case where a second label layer on which a barcode is displayed is peeled off from a first label layer on which the two-dimensional code is displayed.

In order to achieve the above object, a recording tape cartridge according to the present disclosure comprises a case that accommodates a reel around which a recording tape is wound; and a label that is attached to a label surface formed at a wall surface of the case, the wall surface being located at a side opposite to a direction in which the case is loaded into a drive device. The label has a first label layer that is attached to the label surface and on which individual identification information is displayed in a two-dimensional code; and a second label layer that is attached to the first label layer with a peelable bonding force, and the second label layer being capable of covering and concealing the two-dimensional code and the individual identification information being displayed in a barcode on the second label layer. The two-dimensional code is displayed at a central part in a longitudinal direction of the label.

Additionally, a method for a barcode label according to the present disclosure comprises: peeling off the second label layer from the label attached to the label surface of the recording tape cartridge; reading the two-dimensional code displayed on the first label layer from which the second label layer has been peeled off; and creating a new second label layer in which the individual identification information is displayed in a barcode based on the two-dimensional code read on the first label layer.

According to the present disclosure, a loss or the like can be prevented from occurring in a two-dimensional code even in a case in which a second label layer on which a barcode is displayed is peeled off from a first label layer on which the two-dimensional code is displayed.

DESCRIPTION OF THE PREFERRED EMBODIMENTS

Hereinafter, embodiments according to the present disclosure will be described in detail with reference to the drawings. In addition, for convenience of description, in FIG. 1, a loading direction of a recording tape cartridge 10 into a drive device is indicated by arrow A, and is referred to as a forward direction (front side) of the recording tape cartridge 10. Also, a direction of arrow B orthogonal to the arrow A is referred to as a rightward direction (right side), and a direction of arrow C orthogonal to the arrow A and the arrow B is referred to as an upward direction (upper side).

Figure 1:
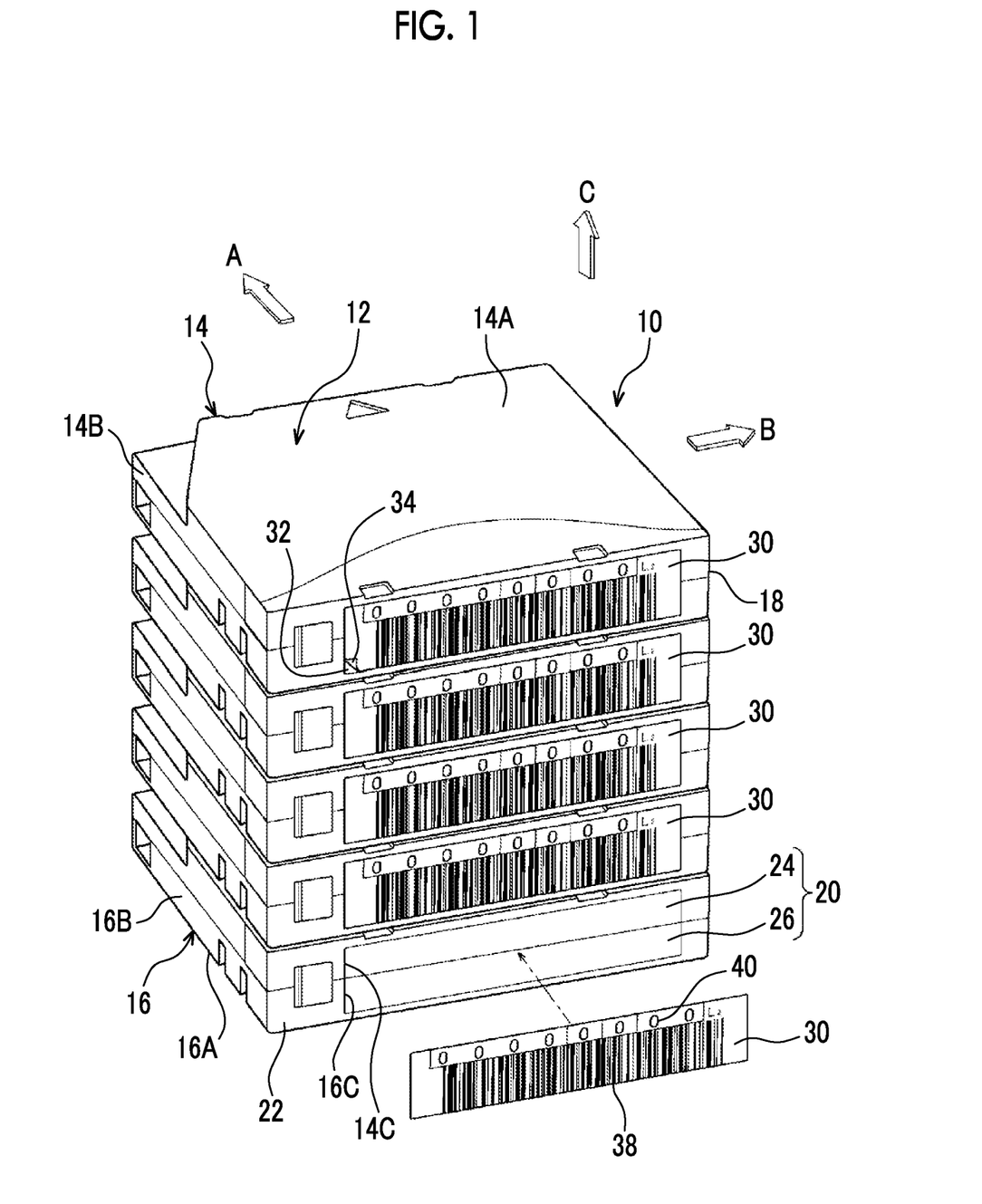
FIG. 1 is a perspective view illustrating a plurality of recording tape cartridges according to a present embodiment as viewed from a rear side.

First, the entire configuration of the recording tape cartridge 10 will be simply described. As illustrated in FIG. 1, the recording tape cartridge 10 has a substantially rectangular box-shaped case 12. The case 12 is made of a resin such as polycarbonate (PC) and includes a first half 14 and a second half 16. The first half 14 has a substantially rectangular top plate 14A, and a first peripheral wall 14B erected on the peripheral edge of the top plate 14A. The second half 16 has a substantially rectangular bottom plate 16A and a second peripheral wall 16B erected on the peripheral edge of the bottom plate 16A.

Additionally, a plurality of (for example, four) screw bosses (not illustrated) which are non-through holes and whose inner peripheral surface is threaded are formed in the vicinity of the respective corners within the first half 14. Also, a plurality of (for example, four) screw bosses (not illustrated) formed as through holes are formed in the vicinity of each corner in the second half 16.

When the case 12 is assembled, a lower end surface of the first peripheral wall 14B and an upper end surface of the second peripheral wall 16B are butted against each other. However, in this case, a lower end surface of each screw boss of the first half 14 and an upper end surface of each screw boss of the second half 16 are butted against each other. Then, in this state, as screws (not illustrated) are inserted into the screw bosses of the second half 16 from the bottom plate 16A and screwed with the screw bosses of the first half 14, the first half 14 and the second half 16 are joined to each other. In addition, means for joining the first half 14 and the second half 16 to each other is not limited to the screws, and may be joined to each other by, for example, ultrasonic welding.

One reel (not illustrated) made of resin is rotatably stored inside the case 12. The reel includes a bottomed cylindrical reel hub, and a disk-shaped upper flange and a disk-shaped lower flange that are respectively provided at both ends of the reel hub in the axial direction. A recording tape, such as a magnetic tape as an information recording and reproducing medium, is wound around an outer peripheral surface of the reel hub, and both ends in a width direction of the recording tape are position-regulated by the upper flange and the lower flange, respectively.

Additionally, an opening (not illustrated) for pulling out the recording tape wound around the reel is formed in the right wall 18 of the case 12. Also, a substantially columnar leader pin, which is pulled out and operated by a pull-out member (not illustrated) of the drive device (not illustrated), is attached to a free end of the recording tape pulled out from the opening. In addition, the opening is opened and closed by a door (not illustrated).

Additionally, a gear opening (not illustrated) for exposing a reel gear (not illustrated) of the reel to the outside is formed at a substantially central part of the second half 16 (bottom plate 16A). The reel is rotationally driven within the case 12 as the reel gear exposed from the gear opening meshes with a drive gear (not illustrated) of the drive device. Additionally, a memory board (not illustrated) in which individual identification information of the recording tape cartridge 10 is stored (registered) and a radio frequency identifier (RFID: not illustrated) are provided within the case 12.

Next, in the recording tape cartridge 10 configured as described above, a label surface 20 formed at a rear wall 22 of the case 12 and a label 30 to be attached to the label surface 20 will be described in detail.

First, the label surface 20 will be described. As illustrated in FIG. 1, the label surface 20 is formed at the rear wall 22 of the case 12 having a substantially rectangular shape (substantially the same shape slightly larger than the label 30) to which a substantially rectangular label 30 of which a leftward-rightward direction is the longitudinal direction is attached. The label surface 20 includes a first half label surface 24 formed at an upper part (first peripheral wall 14B) of the rear wall 22, and a second half label surface 26 formed at a lower part (second peripheral wall 16B) of the rear wall 22.

The first half label surface 24 includes a bottom surface of a substantially rectangular first recess 14C formed at the first peripheral wall 14B, and the second half label surface 26 includes a bottom surface of a substantially rectangular second recess 16C formed at the second peripheral wall 16B. The first half label surface 24 and the second half label surface 26 are flush with each other (a continuous flat surface with no level difference). In addition, the depth of the first recess 14C and the second recess 16C is, for example, between 0.2 mm and 0.5 mm.

Figure 2:
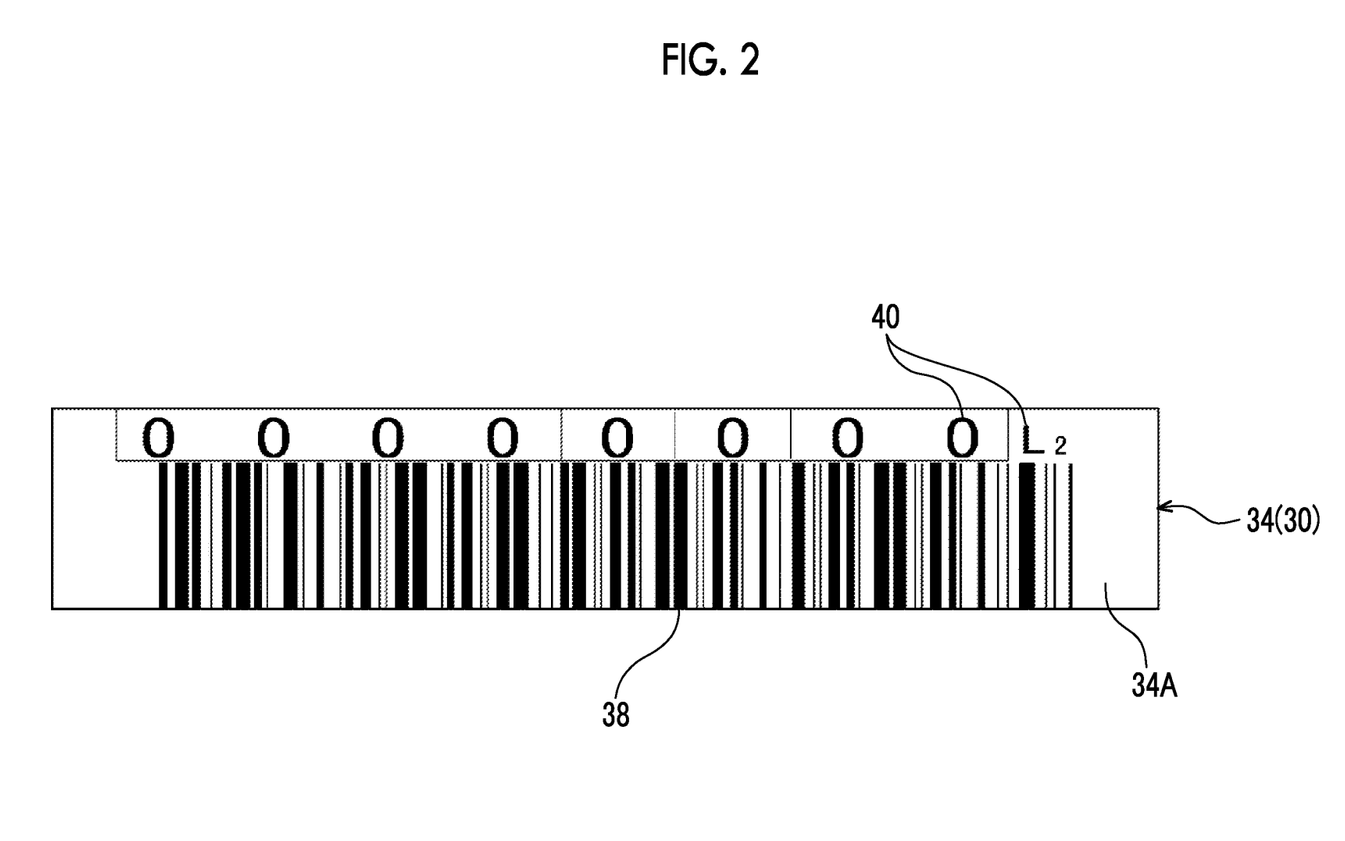
FIG. 2 is a front view illustrating a barcode label constituting a label attached to a label surface of a recording tape cartridge according to the present embodiment.
Figure 3:
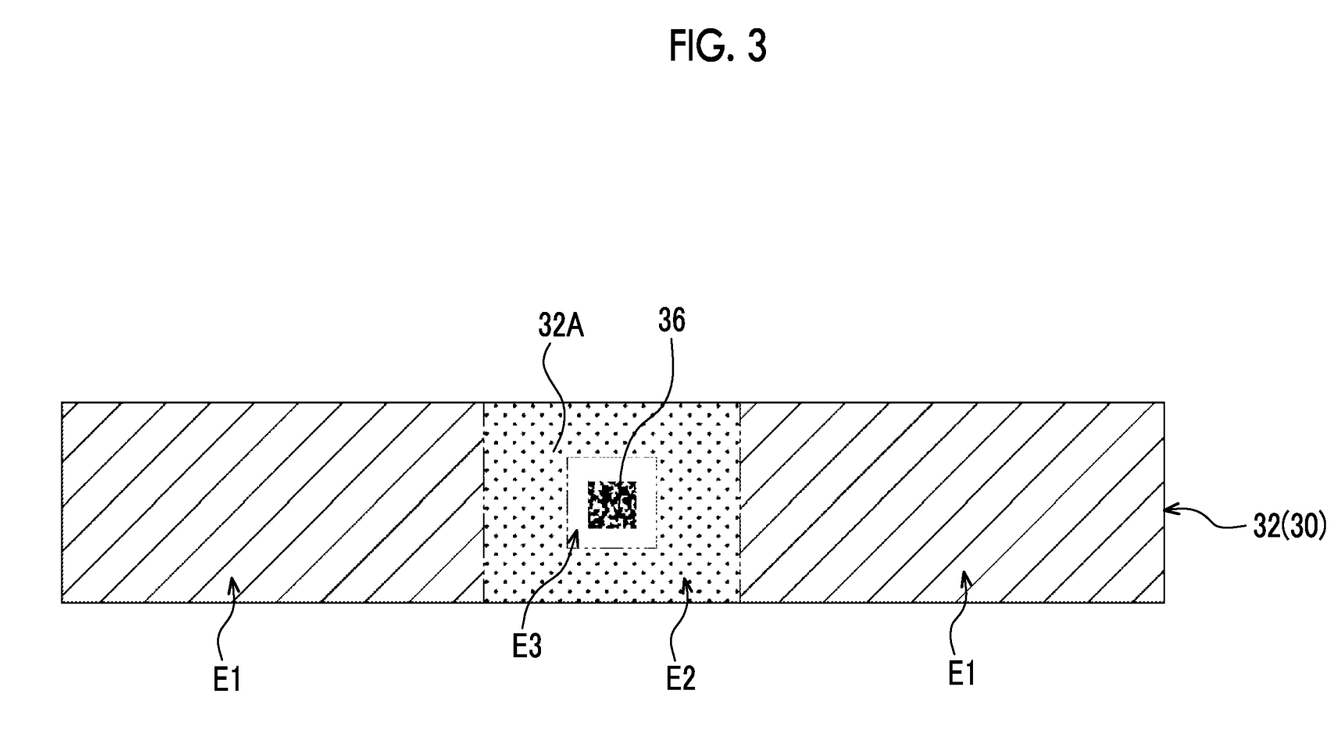
FIG. 3 is a front view illustrating a QR code label constituting the label attached to the label surface of the recording tape cartridge according to the present embodiment.

Next, the label 30 will be described. As illustrated in FIGS. 2 and 3, the label 30 has a two-layer structure. That is, the label 30 has a QR code label 32 (refer to FIG. 3) as a first label layer on which the individual identification information of the recording tape cartridge 10 is displayed with a two-dimensional QR code 36. Also, the label 30 has a barcode label 34 (refer to FIG. 2) as a second label layer on which the individual identification information of the recording tape cartridge 10 is displayed with a one-dimensional barcode 38.

That is, the individual identification information displayed with the QR code 36 and the individual identification information displayed with the barcode 38 are the same information. The individual identification information displayed with the QR code 36 and the individual identification information displayed with the barcode 38 are not limited to the same information, and at least the individual identification information displayed with the QR code 36 needs to include the individual identification information displayed with the barcode 38.

Additionally, a thickness of the label 30 formed by superposing the QR code label 32 and the barcode label 34 on each other and peelably bonding these labels to each other is, for example, 0.2 mm. The thickness of the label 30 is appropriately set such that the label 30 attached to the label surface 20 does not protrude from the first recess 14C and the second recess 16C in a side view.

Figure 4:
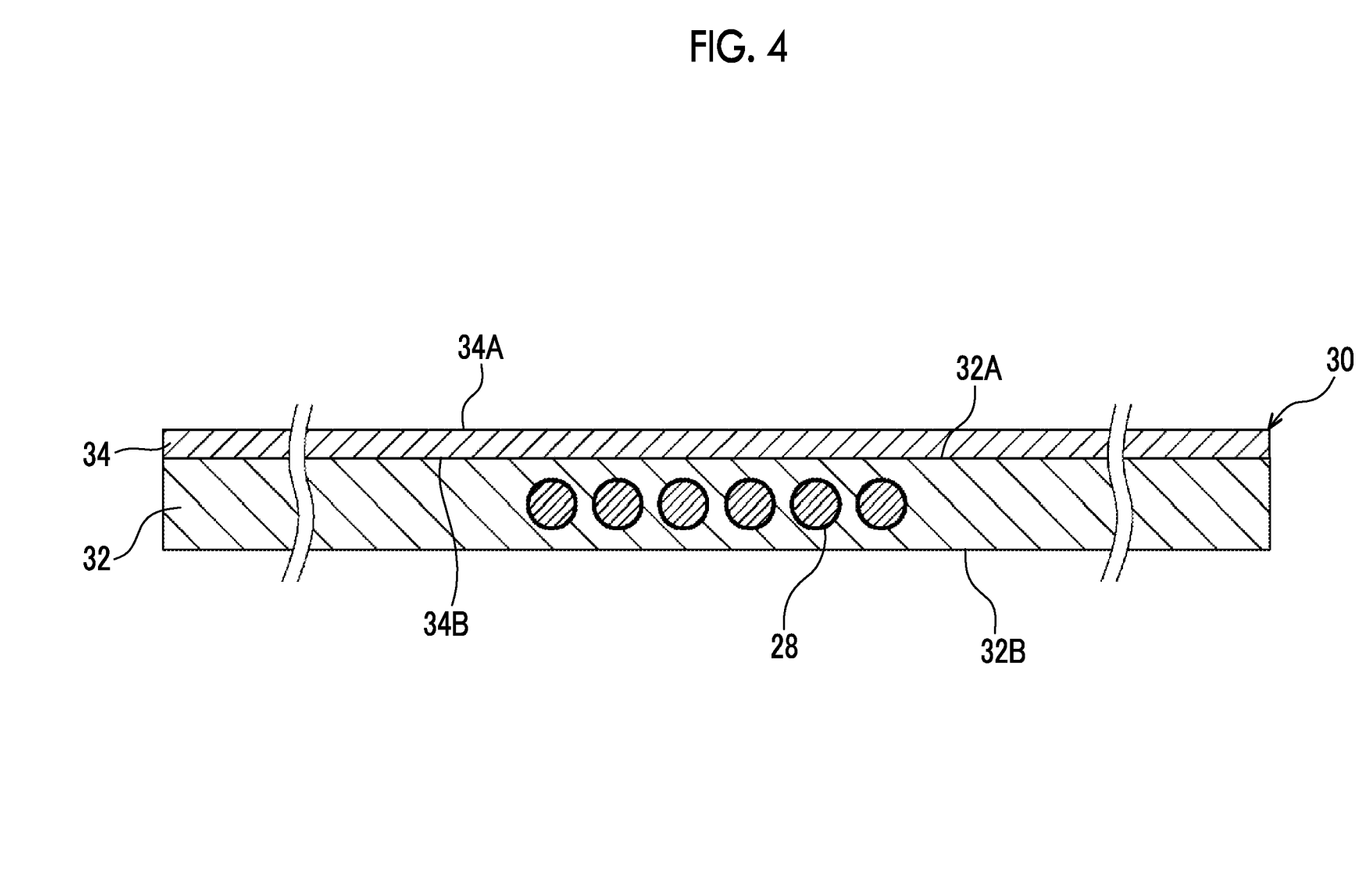
FIG. 4 is a cross-sectional view of a label attached to a label surface of the recording tape cartridge according to the present embodiment.

As illustrated in FIG. 3, the QR code label 32 is made of thermosensitive paper, such as thermo-auto chrome paper (TA paper). As illustrated in FIG. 4, a plurality of microcapsules 28 that develop color by applying heat are embedded at a central part in the longitudinal direction on the layer of the QR code label 32.

That is, the plurality of microcapsules 28 is adapted to develop the color of, for example, a black QR code 36 by heating. Accordingly, even in a state in which a back surface of the barcode label 34, that is, a bonding surface 34B is bonded to a front surface 32A of the QR code label 32, the QR code 36 can be displayed at a central part in the longitudinal direction on the front surface 32A of the QR code label 32 (refer to FIG. 3).

The "central part in the longitudinal direction" on the front surface 32A of the QR code label 32 mentioned above includes a position slightly shifted in the leftward-rightward direction and the upward-downward direction from the central part in the longitudinal direction. Specifically, in a case in which a length of the QR code label 32 in the longitudinal direction is defined at 100%, the QR code 36 only needs to be displayed at the central part in the longitudinal direction having a length of 40% to 30%, preferably, a length of 20%. Additionally, a rear surface opposite to the front surface 32A of the QR code label 32 is a bonding surface 32B that is bonded to the label surface 20 of the recording tape cartridge 10 (case 12) (refer to FIG. 4).

As illustrated in FIG. 2, the barcode label 34 has a barcode 38 printed, by inkjet printing, laser printing, or the like, at a surface 34A opposite to a bonding surface 34B bonded to the front surface 32A of the QR code label 32. Therefore, the barcode label 34 is not particularly limited as long as the barcode label 34 is made of paper on which the barcode 38 can be printed by inkjet printing, laser printing, or the like. In addition, a character code 40, such as numerals and alphabetic characters, is also printed above the barcode 38 on the front surface 34A of the illustrated barcode label 34, but the character code 40 may be omitted.

Additionally, the barcode label 34 is formed in the same shape as the QR code label 32. Also, the bonding surface 34B (refer to FIG. 4) of the barcode label 34 is superimposed on the front surface 32A of the QR code label 32 without shift so as to cover and conceal the QR code 36 displayed at the central part in the longitudinal direction on the front surface 32A of the QR code label 32 and is peelably bonded thereto.

The label 30 is manufactured in a state where the barcode label 34 is bonded to the QR code label 32 and is supplied to a step of attaching the label 30 on the label surface 20 of the recording tape cartridge 10, or the label 30 is attached to the label surface 20 of the recording tape cartridge 10 by the user.

Additionally, the barcode label 34 is not limited to the configuration formed in the same shape as the QR code label 32, and may be formed to be, for example, slightly larger than the QR code label 32 as long as the barcode label 34 can cover and conceal the QR code 36. In a case in which the corners of the barcode label 34 slightly protrude from the corners of the QR code label 32, the corners of the QR code label 32 may not be damaged in a case in which the barcode label 34 is peeled off from the corners thereof.

Additionally, the bonding force of the bonding surface 34B of the barcode label 34 for attaching the barcode label 34 on the front surface 32A of the QR code label 32 is weak at a region which is attached to around the QR code 36 on the front surface 32A and strong at regions which are attached to both ends in the longitudinal direction on the front surface 32A. Specifically, as illustrated in FIG. 3, a predetermined region indicated by oblique lines on the front surface 32A of the QR code label 32 is a region E1 exerted a strong bonding force with the barcode label 34, and a predetermined region indicated by dots is a region E2 exerted a weak bonding force with the barcode label 34.

The "strong" in the bonding force mentioned herein means that the bonding force is stronger than the bonding force exerted around the QR code 36. Similarly, the "weak" in the bonding force means that the bonding force is weaker than the bonding force exerted at both ends in the longitudinal direction. Additionally, a non-bonding region E3 where the barcode label 34 is not attached is included in the region E2 exerted a weak bonding force. Although it is proper that the QR code 36 itself is not exerted a bonding force, it is preferable that a region immediately close to the QR code 36 (a predetermined region outside the peripheral edge of the QR code 36 illustrated in white in FIG. 3) is also defined as the non-bonding region E3.

Next, the function of the label 30 configured as described above (including a barcode label reissuing method) will be described.

Figure 5:
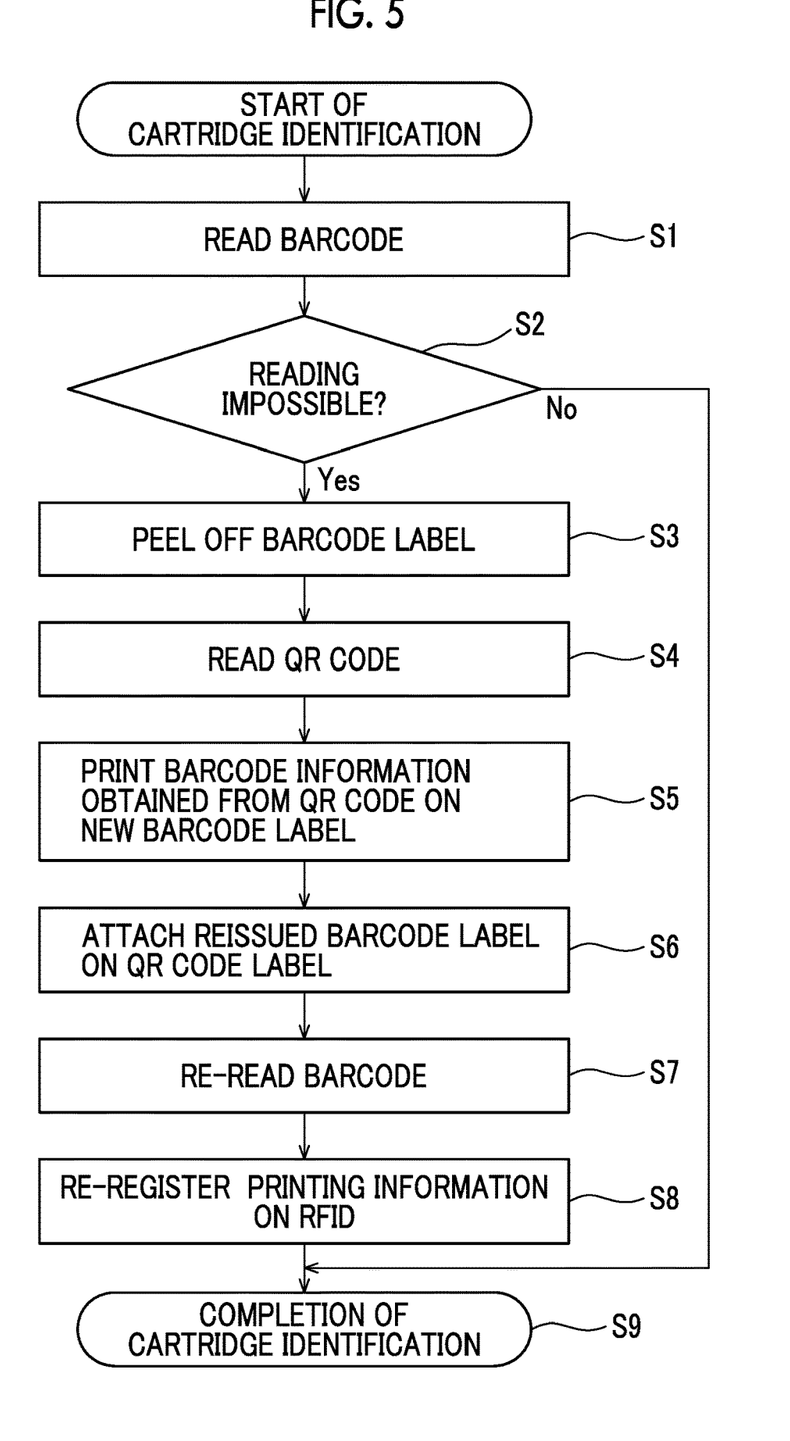
FIG. 5 is a flowchart illustrating a method for reissuing a barcode label according to the present embodiment.

As illustrated in FIG. 5, the barcode 38 displayed on the label 30 (barcode label 34) attached to the label surface 20 of the recording tape cartridge 10 to identify the individual recording tape cartridge 10 is read by an optional barcode reader (not illustrated) provided at the robot hand (Step: S1). In that case, it is determined whether the barcode 38 can be read (Step: S2).

This is, there is a case where the barcode 38 displayed on the barcode label 34 cannot be read by the barcode reader, as the barcode 38 may be vulnerable to scratches and dirt caused by the handling of the robot hand or the like and may be discolored due to aging deterioration. Therefore, as described above, it is determined whether or not the barcode 38 can be read. In a case in which the barcode 38 can be read, the individual identification of the recording tape cartridge 10 is enabled. Therefore, and the individual identification is completed (Step: S9).

On the other hand, in a case in which the barcode 38 cannot be read, the user peels the barcode label 34 from the QR code label 32, as the individual identification of the recording tape cartridge 10 is impossible (peeling step; Step: S3). Then, the user reads the QR code 36 displayed at the central part in the longitudinal direction on the front surface 32A of the QR code label 32 by an optional QR code reader (not illustrated), such as a smart phone (reading step; Step: S4).

In a case in which the QR code 36 displayed on the front surface 32A of the QR code label 32 is read, the user transmits the information (individual identification information) of the barcode 38 obtained from the QR code 36 to an optional printer by communication means, such as Wi-Fi (registered trademark). Then, the barcode 38 is printed on a front surface 34A of a new barcode label 34 on which the barcode 38 is not printed, by the printer. That is, a new barcode label 34 (new second label layer) is created (creation step; Step: S5).

The new barcode label 34 on which the barcode 38 is not printed is available in advance, for example, by being attached to the recording tape cartridge 10 as an accessory in a case where the user purchases the recording tape cartridge 10.

In a case in which the new barcode label 34 is created in this way, the user attaches the bonding surface 34B of the new barcode label 34 to the front surface 32A of the QR code label 32, which the bonding surface 32B is attached to the label surface 20 (Step: S6). Then, the barcode 38 printed on the front surface 34A of the new barcode label 34 is read by an optional barcode reader (re-reading step; Step: S7).

Thereafter, the read information (individual identification information) of the barcode 38 is registered in the RFID provided at the case 12 of the recording tape cartridge 10 by optional communication registration means (registration step; Step: S8). Since the information of the barcode 38 (individual identification information) was originally registered in the RFID, the fact that the barcode label 34 has been reissued is recorded in the RFID by this re-registration. Then, since the individual identification of the recording tape cartridge 10 is enabled by the re-reading step, the individual identification is completed (S9).

Here, as described above, the QR code 36 is displayed at the central part in the longitudinal direction on the front surface 32A of the QR code label 32. Also, the bonding force for attaching the bonding surface 34B of the barcode label 34 on the front surface 32A of the QR code label 32 is weak at a region which is attached to around the QR code 36 (including the non-bonding region E3) on the front surface 32A and strong at regions which are attached to both ends in the longitudinal direction on the front surface 32A (refer to FIG. 3).

Therefore, it is possible to keep or prevent the barcode label 34 from being inadvertently peeled off (partially peeled) from the QR code label 32, and it is possible to improve the durability of the label 30. Also, in a case in which the user peels off the barcode label 34 from the QR code label 32, it is possible to prevent a part of the QR code 36 from being peeled off together with the barcode label 34 and causing a loss or the like of the QR code 36.

Figure 6:
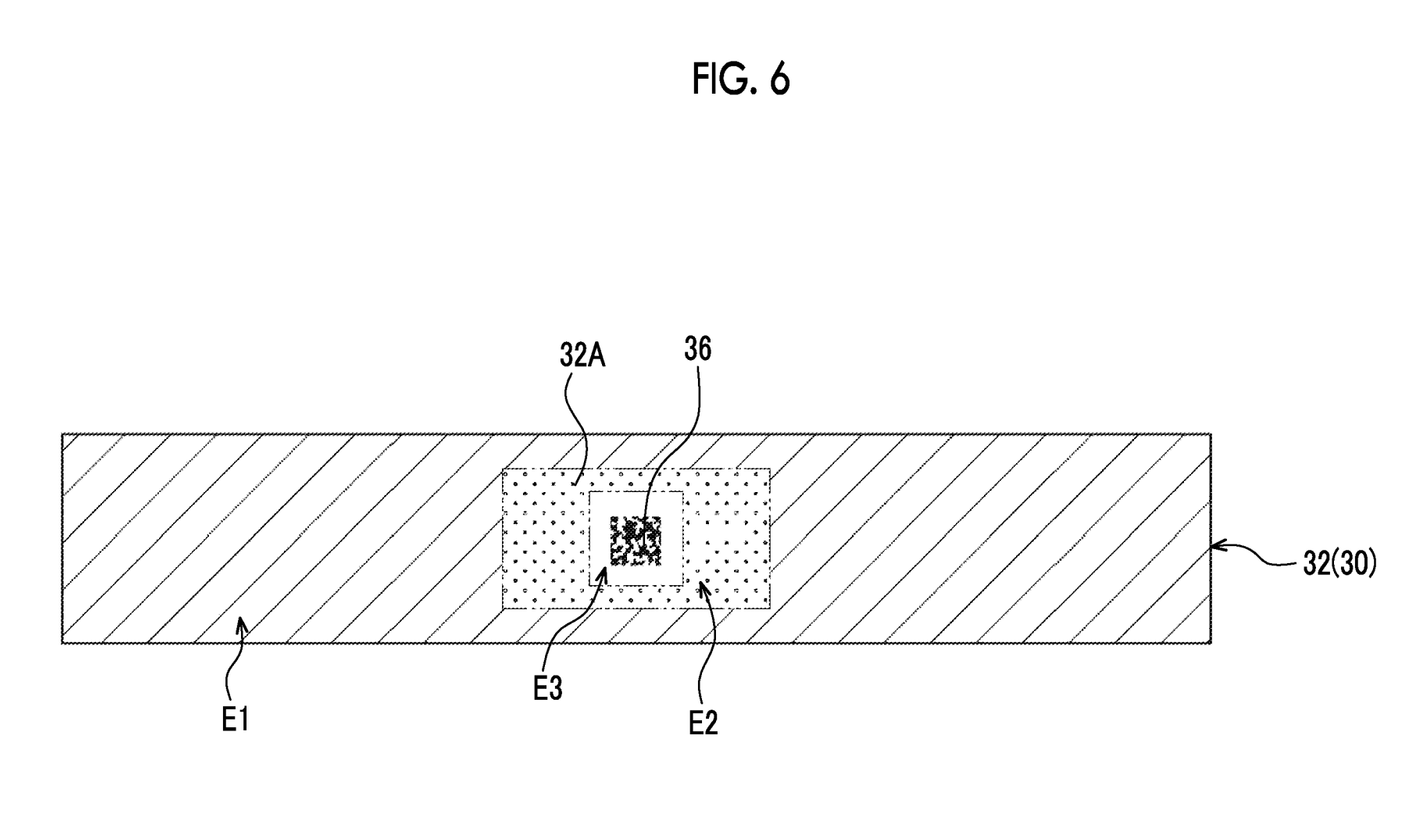
FIG. 6 is a front view illustrating a QR code label having a different adhesive region from that of FIG. 3, which constitutes the label attached to the label surface of the recording tape cartridge according to the present embodiment.

Additionally, as illustrated by oblique lines in FIG. 6, the bonding force for attaching the bonding surface 34B of the barcode label 34 on the front surface 32A of the QR code label 32 may be weak around the region which is attached to the QR code 36 (including the non-bonding region E3) on the front surface 32A and strong at a region which is attached to the peripheral edge thereof on the front surface 32A.

That is, not only both ends in the longitudinal direction of the QR code label 32 (leftward-rightward direction) but also both upper and lower ends thereof located above and below the QR code 36 may be regions E1 where the bonding force exerted with the barcode label 34 is strong. It is possible to keep or prevent dust or the like from entering through a gap between the front surface 32A of the QR code label 32 and the bonding surface 34B of the barcode label 34 at both upper and lower ends of the label 30.

Additionally, although not illustrated, the QR code 36 may be directly printed on the central part in the longitudinal direction of the label surface 20 of the recording tape cartridge 10 (case 12) together with a white base layer by inkjet printing, laser printing, or the like. In this case, only the barcode label 34 is attached to the label surface 20. In addition, in this case, it is preferable that the bonding force of the bonding surface 34B of the barcode label 34 is weaker at a region attached around the QR code 36 on the label surface 20 and stronger at regions attached to both ends (or peripheral edge) in the longitudinal direction on the label surface 20.

As described above, the recording tape cartridge 10 and the method for reissuing a barcode label according to the present embodiment have been described based on the drawings. However, the recording tape cartridge 10 and the method according to the present embodiment are not limited to those illustrated. Design changes can be appropriately made without departing from the scope of the present disclosure. For example, in the method for reissuing a barcode label according to the present embodiment, the registration step may be omitted.

Additionally, as long as the bonding force of the bonding surface 34B of the barcode label 34 attached to the region E2 indicated by the dots in FIG. 3 is a sufficiently weak bonding force to such a degree that there is no risk that a part of the QR code 36 is peeled off together with the barcode label 34 in a case where the barcode label 34 is peeled off from the QR code label 32, the non-bonding region E3 illustrated in white in FIG. 3 may not be formed.

Additionally, except a case where the barcode 38 cannot be read due to scratches, dirt, aging deterioration, or the like, for example, even in a case where the barcode label 34 is peeled off from the QR code label 32 and is lost, the method for reissuing a barcode label according to the present embodiment can be executed (in this case, may be executed from the reading step).

Moreover, the information (individual identification information) of the barcode 38 may be read from the RFID stored at the case 12, and a new barcode label 34 may be created based on the read information of the barcode 38. Additionally, if a QR code reader (not illustrated) capable of reading the QR code 36 is provided at a robot hand of a library, the individual identification of the recording tape cartridge 10 is enabled by reading the QR code 36. Therefore a new barcode label 34 may not be created.

Additionally, the case 12 may have a configuration in which the rear wall 22 is formed, for example, only by the first half 14 or only by the second half 16. That is, the label surface 20 may be formed only at a rear wall of the first half 14 or only at a rear wall of the second half 16. Additionally, the barcode 38 and the QR code 36 may be the same as, for example, the serial number of a memory board (not illustrated) provided at the case 12 or may indicate the generation of the recording tape cartridge 10.

What is claimed is:

1. A recording tape cartridge comprising:
    a case that accommodates a reel around which a recording tape is wound; and
    a label that is attached to a label surface formed at a wall surface of the case, the wall surface being located at a side opposite to a direction in which the case is loaded into a drive device,
    wherein the label comprises:
        a first label layer that is attached to the label surface and on which individual identification information is displayed in a two-dimensional code; and
        a second label layer attached to the first label layer with a peelable bonding force, the second label layer being capable of covering and concealing the two-dimensional code, and the individual identification information being displayed in a barcode on the second label layer, and
    wherein the two-dimensional code is displayed at a central part in a longitudinal direction of the label.

2. The recording tape cartridge according to claim 1, wherein a bonding force of the second label layer for attaching the second label layer to a periphery of the two-dimensional code of the first label layer is weaker than a bonding force of the second label layer for attaching the second label layer to both ends in a longitudinal direction of the first label layer.

3. The recording tape cartridge according to claim 1, wherein a bonding force of the second label layer for attaching the second label layer to a periphery of the two-dimensional code of the first label layer is weaker than a bonding force of the second label layer for attaching the second label layer to a peripheral edge of the first label layer.

4. The recording tape cartridge according to claim 1, wherein the first label layer is made of a thermosensitive paper.

5. A method for reissuing a barcode label for a recording tape cartridge comprising a case that accommodates a reel around which a recording tape is wound and a label attached to a label surface formed at a wall surface of the case, the wall surface being located at a side opposite to a direction in which the case is loaded into a drive device, wherein the label includes a first label layer, attached to the label surface, on which individual identification information is displayed in a two-dimensional code and a second label layer attached to the first label layer with a peelable bonding force, the second label layer being capable of covering and concealing the two-dimensional code, the individual identification information being displayed in a barcode on the second label layer, and the two-dimensional code being displayed at a central part in a longitudinal direction of the label, the method comprising:

peeling off the second label layer from the label attached to the label surface of the recording tape cartridge;

reading the two-dimensional code displayed on the first label layer from which the second label layer has been peeled off; and     creating a new second label layer on which the individual identification information is displayed in a barcode, based on the two-dimensional code read on the first label layer.

6. The method for reissuing a barcode label according to claim 5, further comprising:

reading the barcode displayed on the new second label layer after attaching the created new second label layer to the first label layer.

7. The method for reissuing a barcode label according to claim 6, further comprising:

registering barcode information that has been read at an RFID identifier provided at the case.

8. The method for reissuing a barcode label according to claim 5, wherein the peeling of the second label layer is initiated in a case in which the barcode of the second label layer cannot be read.

\* \* \* \* \*